Figure 1:
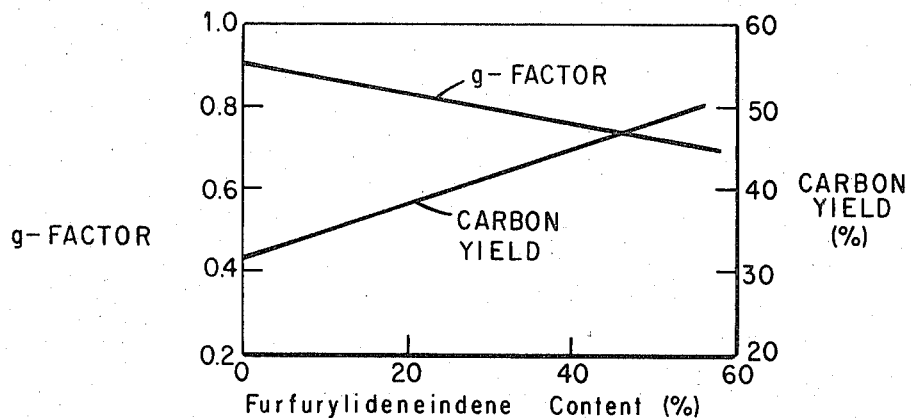

phite precursor is prepared from a binary mixture of a thermoplastic resin precursor derived from indene and a thermosetting resin precursor of the same derivation. The crystalline microstructure of the graphite is reproducibly controlled by selectively varying the quantity of the thermosetting resin employed in the precursor mixture.

United States Patent [19]
Horne, Jr. et al.

[11] 3,859,422
[45] Jan. 7, 1975

[54] METHOD FOR REPRODUCIBLY CONTROLLING THE CRYSTALLINITY OF SYNTHETIC GRAPHITE

[75] Inventors: Ottis J. Horne, Jr.; Wesley E. Smith, both of Oak Ridge, Tenn.

[73] Assignee: The United States of America as represented by the United States Atomic Energy Commission, Washington, D.C.

[22] Filed: Oct. 16, 1972

[21] Appl. No.: 298,136

[52] U.S. Cl. ......... 423/448, 252/188.3 R, 260/88.2, 260/88.5, 260/874, 264/29, 423/445
[51] Int. Cl. ..................... C01b 31/02, C01b 31/04
[58] Field of Search ...... 423/448, 449, 445; 264/29; 252/188.3 R; 268/88.2, 88.5, 874

[56] References Cited
UNITED STATES PATENTS 3,057,687  10/1962  Mitchell ............................ 423/448
3,792,155  2/1974  Smith et al. ...................... 423/449 X

OTHER PUBLICATIONS

Fitzer et al., "Chemistry and Physics of Carbon," Vol. 7, 1971, pages 237, 238, 247–252, 304 & 305.
Lewis et al., "Proceedings of the Conferences on Carbon," Vol. 2, (1961) copyright 1963, pages 413–430.

Primary Examiner—Edward J. Meros
Assistant Examiner—Gary A. Straub
Attorney, Agent, or Firm—John A. Horan; David S. Zachry; Earl L. Larcher

[57] ABSTRACT

A synthetic graphite precursor is prepared from a binary mixture of a thermoplastic resin precursor derived from indene and a thermosetting resin precursor of the same derivation. The crystalline microstructure of the graphite is reproducibly controlled by selectively varying the quantity of the thermosetting resin employed in the precursor mixture.

3 Claims, 3 Drawing Figures

METHOD FOR REPRODUCIBLY CONTROLLING THE CRYSTALLINITY OF SYNTHETIC GRAPHITE

The present invention relates generally to the preparation of carbon and synthetic graphite from resin precursors of indene derivatives, and more particularly to the control of the carbon yield and the crystallinity of the graphite. This invention was made in the course of, or under, a contract with the U.S. Atomic Energy Commission.

Graphite is well known as a structural material in nuclear reactors and other applications where high temperature and corrosive chemical activities are encountered. The lack of satisfactorily high carbon yields from carbon precursors and the inability of accurately controlling the reproducibility of the crystalline structures in synthetic graphite have been responsible for some shortcomings or drawbacks which complicate carbon and graphite technology.

It is the principal goal or objective of the present invention to provide a method and carbon precursor for increasing the coke or carbon yields and for selectively controlling in a reproducible manner the crystalline structure or microstructure of synthetic graphite prepared from indene-derived hydrocarbon resin precursors. The increased carbon yield and the control of crystal structure in the graphite are attained by employing binary mixtures of thermoplastic indene-derived resin precursors and thermosetting indene-derived resin precursors with the quantity of the thermosetting resin precursor in the mixture being selectively varied in accordance with the carbon yield or graphite crystal structure desired from the carbon precursor.

Other and further objects of the invention will be obvious upon an understanding of the illustrative method and graphite precursors about to be described, or will be indicated in the appended claims, and various advantages not referred to herein will occur to one skilled in the art upon employment of the invention in practice.

Graphs relating to various binary mixtures of thermoplastic and thermosetting indene-derived resin precursors have been chosen for the purpose of illustration and description. These graphs are not intended to be exhaustive or to limit the invention to the precise mixtures disclosed. They are chosen and described in order to best explain the principles of the invention and their application in practical use to thereby enable others skilled in the art to best utilize the invention in various embodiments and modifications as are best adapted to the particular use contemplated.

Figure 2:
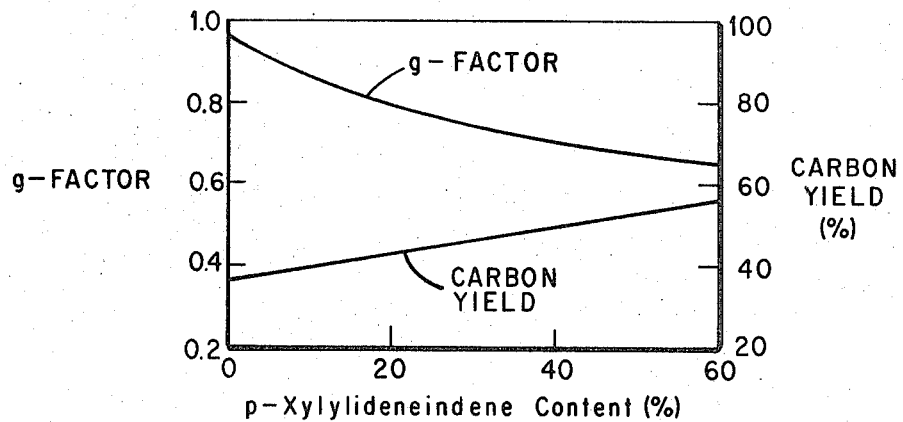
Figure 3:
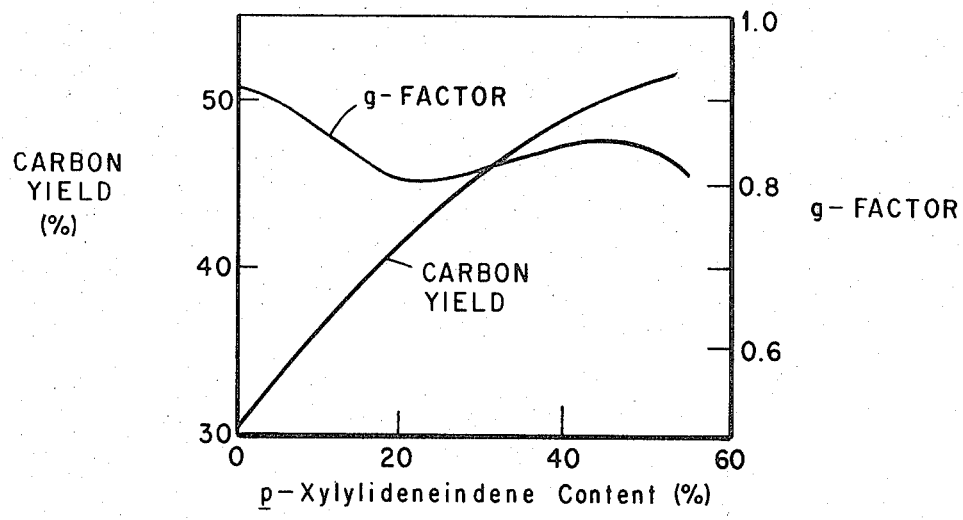

In the accompanying drawing:

FIGS. 1 through 3 are graphs illustrating the carbon yield and degree of graphitization (g-factor) obtained from binary mixtures of cinnamylideneindene and furfurylideneindene, cinnamylideneindene and p-xylylideneindene, and acenaphthylene and p-xylylideneindene, respectively.

Described generally, the present invention is directed to the method and compositions for preparing carbon and graphite from binary mixtures composed of a blend of a thermoplastic indene-derived resin precursor and a thermosetting indene-derived resin precursor. The thermoplastic resin precursor is homogeneously mixed with a preselected quantity of the thermosetting resin precursor to ultimately provide the graphite product with a desired microstructure. After forming the mixture it may then be heated in an inert atmosphere such as argon or nitrogen for a duration of about 2 to 6 hours at a temperature in the range of about 250° to 350°C. to form a resin useful in binder applications. If desired, this mixture may be heated in an inert atmosphere directly to a temperature in the range of about 900° to 1,000°C. for converting the resin mixture to carbon or to a temperature in the range of about 2,700° to 2,800°C. for forming graphite with the resulting carbon or graphite being employed as a filler material in the manufacture of carbon or graphite structures.

Copolymerization of the resin precursor mixture is believed to occur at about 250°C. with the enhanced carbon yield and the control of graphite crystallinity being due to the extent of crosslinking in the formed polymers which is, in turn, controlled by the quantity of thermosetting resin precursor in the mixture. Increased crosslinking on polymerization generally increases the carbon yeild and tends to decrease the crystallinity of a carbon by decreasing the molecular mobility that is necessary for crystal orientation processes during the formation of graphite. Controlling the extent of this crosslinking by employing selected quantities of the thermosetting resin precursor in the binary mixture provides a positive mechanism for controlling the crystalline structure of the graphite in a highly reproducible manner. As will be described in greater detail below, the greater the quantity of the thermosetting resin precursor employed the lower the degree or extent of crystallinity in the graphite.

The extent of crystallinity of the graphite may be readily expressed as a g-factor or degree of graphitization of the carbon material. The g-factor represents the percentage of carbon converted to graphite as determined by the formula $$d_{002} = (g)\ 3.354 + (1\text{-}g)\ 3.44$$

The term $d_{002}$ is the interlayer spacing of the graphite crystals along the 002 plane while the numbers 3.44 and 3.354 are measurements in angstroms relating to the interlayer spacings of amorphous carbon and crystalline graphite, respectively. These numbers characterize all forms of carbon heated to temperatures as high as 3,000°C. which show a g-factor with the numeral 1.0 being representative of complete conversion of the carbon to graphite.

The description of the present invention below is primarily directed to the formation of carbon and graphite precursors from binary mixtures of cinnamylideneindene or acenaphthylene as the thermoplastic resin precursor with furfurylideneindene or p-xylylideneindene as the thermosetting resin precursor. However, it is to be understood that other indene-derived thermoplastic resins such as benzylideneindene, 9-anthrylideneindene, and isotruxene may be successfully employed in the method and composition of the present invention. It has been found that satisfactory control of the increased carbon yield and the graphite microstructure obtained by employing the aforementioned binary mixtures can be provided by using the thermosetting resin precursor in concentrations ranging from an effective or finite quantity near zero weight per cent which will result in a finite increase in carbon yield or finite change in the crystal structure of the graphite to about 60 weight per cent. The graphite microstructures obtained from blends containing greater than 60 weight per cent thermosetting resin precursor were similar to those obtained for the thermosetting resin precursor alone, though carbon yields for these respective mixtures continued to increase with increased concentrations of the thermosetting resin precursor as they approached the carbon yield for the thermosetting resin precursor alone.

Reproducibility of essentially similar carbon yields or graphite crystal structure over several runs may be more readily attained by employing a continuous flow operation with uniform bed depth in a tunnel furnace or the like. Using a uniform bed depth and continuous flow insures that the results obtained over several runs are consistent regardless of the quantity or size of the resin mixture employed in any individual run.

The examples set forth below are illustrative of the control over the crystalline microstructure of graphite and the carbon yield obtained by employing selective concentrations of the thermosetting resin precursors in binary mixtures of thermoplastic and thermosetting indene-derived resin precursors.

EXAMPLE I

Five separate mixtures of cinnamylideneindene and furfurylideneindene were homogeneously blended and together with one batch of cinnamylideneindene were carbonized in an argon atmosphere at 1,000°C. Each of the five mixtures had a total pre-carbonization weight of 30 grams and contained furfurylideneindene in concentrations of 10 to 50 weight per cent. The six samples of carbon precursor materials were polymerized and carbonized in one continuous operation by increasing the temperature at a rate of 15°C. per hour to 1,000°C. without a hold time at peak temperature. A portion of each carbonized sample was removed for carbon yield measurements while the remainder was graphitized at a temperature of 2,800°C. in an argon atmosphere. Data obtained from the aforementioned procedure are shown in FIG. 1 and Table I below. The properties of the graphite after heating the carbons to 2,800°C. are shown in the table by the g-factor, by the average thickness ($L_c$ in A) of the graphite crystals, and by the interlayer spacing ($d_{004}$ in A) of the graphite.

As shown in the above table and FIG. 1 the carbon yield values increased while the crystallinity, as expressed in g-factors, decreased as the furfurylideneindene concentration increased. This data indicates that highly crystalline microstructures of graphite can be gradually changed into a homogeneous noncrystalline structure with additions of the thermosetting resin precursor to the graphite precursor mixture.

EXAMPLE II

Six samples of cinnamylideneindene and p-xylylideneindene were prepared with p-xylylideneindene concentrations in the range of 10 to 60 weight per cent of the mixture. These samples together with one sample of cinnamylideneindene were treated and analyzed in the manner described in Example I. As shown in FIG. 2 and Table II below, the carbon yield and graphite crystal structure were controlled by the incorporation of p-xylylideneindene in various concentrations in the binary mixture.

TABLE II

| Sample | p-Xylylideneindene Content (%) | Carbon Yield After 1000°C. (%) | Properties after 2800°C. | | |
|---|---|---|---|---|---|
| | | | $d_{004}$ (A) | $L_c$ (A) | $g_{factor}$ |
| A | 0 | 37 | 1.6791 | 114 | 0.951 |
| B | 10 | 38 | 1.6834 | 147 | 0.851 |
| C | 20 | 44 | 1.6854 | 79 | 0.805 |
| D | 30 | 44 | 1.6865 | 70 | 0.779 |
| E | 40 | 48 | 1.6891 | 63 | 0.719 |
| F | 50 | 53 | 1.6917 | 67 | 0.658 |
| G | 60 | 56 | 1.6923 | 57 | 0.644 |

EXAMPLE III

Acenaphthylene was blended with p-xylylideneindene in concentrations in the range of 10 to 50 weight per cent. Five samples of the above mixtures with different concentrations of p-xylylideneindene and one sample of acenaphthylene were treated and analyzed as described in Example I. FIG. 3 and Table III below show a carbon yield increase from 30 to about 50 per cent and the control over the crystalline structure provided by the additions of p-xylylideneindene.

TABLE I

| Sample | Furfurylideneindene Content (%) | Carbon Yield After 1000°C. (%) | Properties after 2800°C. | | |
|---|---|---|---|---|---|
| | | | $d_{004}$ (A) | $L_c$ (A) | $g_{factor}$ |
| A | 0 | 32 | 1.6814 | 248 | 0.898 |
| B | 10 | 36 | 1.6817 | 129 | 0.891 |
| C | 20 | 39 | 1.6828 | 142 | 0.865 |
| D | 30 | 44 | 1.6862 | 88 | 0.786 |
| E | 40 | 46 | 1.6860 | 93 | 0.791 |
| F | 50 | 48 | 1.6891 | 103 | 0.719 |

TABLE III

| Sample | p-Xylylideneindene Content (%) | Carbon Yield After 1000°C. (%) | Properties after 2800°C. | | |
|---|---|---|---|---|---|
| | | | $d_{004}$ (A) | $L_c$ (A) | $g_{factor}$ |
| A | 0 | 30 | 1.6811 | 385 | 0.905 |
| B | 10 | 37 | 1.6831 | 305 | 0.858 |
| C | 20 | 42 | 1.6857 | 180 | 0.798 |
| D | 30 | 45 | 1.6845 | 204 | 0.826 |
| E | 40 | 49 | 1.6834 | 270 | 0.851 |
| F | 50 | 51 | 1.6842 | 218 | 0.833 |

It will be seen that the present invention provides a mechanism by which the natural or inherent crystalline microstructure of graphite prepared from a synthetic carbon precursor can be readily modified by the addition of another synthetic carbon precursor. Also, by selectively varying the concentration of the additive, graphite having a preselected crystalline structure can be easily reproduced. As particularly evidenced by FIGS. 1–3, changes occur in the graphite crystalline structure by employing such additions in concentrations near zero weight per cent.

What is claimed is:

1. A method for preparing synthetic graphite and selectively varying the crystalline microstructure of the graphite by the steps of forming a homogeneous blend of a thermoplastic indene-derived resin precursor selected from the group consisting of cinnamylideneindene, benzylideneindene, 9-anthrylideneindene, acenaphthylene, and isotruxene, and a thermosetting indene-derived resin precursor selected from the group consisting of furfurylideneindene and p-sylylideneindene, said thermosetting indene-derived resin precursor being in the blend at a concentration in the range of a finite quantity near 0 weight per cent sufficient to provide a finite change in the crystal size and interlayer spacing of the graphite to a maximum quantity of about 60 weight per cent for selectively varying said crystal size and said interlayer spacing from said finite change, and graphitizing the blend in an inert atmosphere.

2. A carbon precursor for the manufacture of carbon consisting of a homogeneous blend of a thermoplastic indene-derived resin precursor selected from the group consisting of cinnamylideneindene, benzylideneindene, 9-anthrylideneindene, acenaphthylene, and isotruxene, and a thermosetting indene-derived resin precursor selected from the group consisting of furfurylideneindene and p-xylylideneindene with the thermosetting resin precursor being of a concentration in the range of a finite quantity near 0 weight per cent sufficient to provide a finite increase in the carbon yield to a maximum quantity of about 60 weight per cent to provide a maximum increase in the carbon yield.

3. A graphite precursor for the manufacture of graphite consisting of a homogeneous blend of a thermoplastic indene-derived resin precursor selected from the group consisting of cinnamylideneindene, benzylideneindene, 9-anthrylideneindene, acenaphthylene, and isotruxene, and a thermosetting indene-derived resin precursor selected from the group consisting of furfurylideneindene and p-xylylideneindene with the thermosetting resin precursor being of a concentration in the range of a finite quantity near 0 weight per cent sufficient to provide a finite change in the crystal size and interlayer spacing of the graphite to a maximum quantity of about 60 weight per cent.

* * * * *